United States Patent
Tsai et al.

(10) Patent No.: US 11,272,182 B2
(45) Date of Patent: Mar. 8, 2022

(54) METHODS AND APPARATUS OF ALTERNATIVE TRANSFORM SKIP MODE FOR IMAGE AND VIDEO CODING

(71) Applicant: MEDIATEK INC., Hsinchu (TW)

(72) Inventors: Chia-Ming Tsai, Hsinchu (TW); Chih-Wei Hsu, Hsinchu (TW); Tzu-Der Chuang, Hsinchu (TW); Ching-Yeh Chen, Hsinchu (TW); Shih-Ta Hsiang, Hsinchu (TW); Yu-Wen Huang, Hsinchu (TW); Zhi-Yi Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/048,208

(22) PCT Filed: Apr. 17, 2019

(86) PCT No.: PCT/CN2019/083005
§ 371 (c)(1),
(2) Date: Oct. 16, 2020

(87) PCT Pub. No.: WO2019/205998
PCT Pub. Date: Oct. 31, 2019

(65) Prior Publication Data
US 2021/0092394 A1 Mar. 25, 2021

Related U.S. Application Data

(60) Provisional application No. 62/792,388, filed on Jan. 14, 2019, provisional application No. 62/675,235,
(Continued)

(51) Int. Cl.
*H04N 19/132* (2014.01)
*H04N 19/119* (2014.01)
(Continued)

(52) U.S. Cl.
CPC ......... *H04N 19/132* (2014.11); *H04N 19/119* (2014.11); *H04N 19/159* (2014.11);
(Continued)

(58) Field of Classification Search
None
See application file for complete search history.

(56) References Cited

U.S. PATENT DOCUMENTS

| 9,749,645 B2 | 8/2017 | Li et al. |
| 2013/0039417 A1 | 2/2013 | Wang et al. |

(Continued)

FOREIGN PATENT DOCUMENTS

| CN | 102447907 A | 5/2012 |
| CN | 103733628 A | 4/2014 |

OTHER PUBLICATIONS

International Search Report dated May 29, 2019, issued in application No. PCT/CN2019/083005.
(Continued)

*Primary Examiner* — Frederick D Bailey
(74) *Attorney, Agent, or Firm* — McClure, Qualey & Rodack, LLP

(57) ABSTRACT

A method and apparatus for video coding using block partition are disclosed. According to the present invention, a partition structure corresponding to recursively partitioning a current block into smaller TU (transform unit) blocks until the partition structure reaches a maximum allowed split depth or until a block size of at least one of smaller TU blocks is a supported core transform size, where the current block is partitioned into final smaller TU blocks according to the partition structure. A transform coding process is applied to the current block according to the partition structure, where the transform coding process is skipped for at least one of the final smaller TU blocks. A flag can be
(Continued)

signalled for the current block to indicate whether the current block is allowed to skip the transform coding process for said at least one of the final smaller TU blocks.

17 Claims, 4 Drawing Sheets

Related U.S. Application Data filed on May 23, 2018, provisional application No. 62/661,663, filed on Apr. 24, 2018.

(51) Int. Cl.
*H04N 19/176* (2014.01)
*H04N 19/70* (2014.01)
*H04N 19/96* (2014.01)
*H04N 19/172* (2014.01)
*H04N 19/61* (2014.01)
*H04N 19/46* (2014.01)
*H04N 19/159* (2014.01)
*H04N 19/186* (2014.01)

(52) U.S. Cl.
CPC ......... *H04N 19/172* (2014.11); *H04N 19/176* (2014.11); *H04N 19/186* (2014.11); *H04N 19/46* (2014.11); *H04N 19/61* (2014.11); *H04N 19/70* (2014.11); *H04N 19/96* (2014.11)

(56) References Cited

U.S. PATENT DOCUMENTS

| | | | |
|---|---|---|---|
| 2014/0241641 A1* | 8/2014 | Jeon | H04N 19/14 382/233 |
| 2014/0307780 A1 | 10/2014 | Cohen et al. | |
| 2015/0304670 A1* | 10/2015 | Liu | H04N 19/96 375/240.13 |
| 2017/0244964 A1 | 8/2017 | Liu et al. | |
| 2018/0084284 A1* | 3/2018 | Rosewarne | H04N 19/91 |
| 2020/0077094 A1* | 3/2020 | Poirier | H04N 19/176 |
| 2021/0021810 A1* | 1/2021 | Kang | H04N 19/105 |

OTHER PUBLICATIONS

Chinese language office action dated Dec. 9, 2019, issued in application No. TW 108113647.
European Search Report dated 2021-12-15, issued in application No. EP 19793139.7.
Schwarz, H., et al.; "Block Structures and Parallelism Features in HEVC;" High Efficiency Video Coding (HEVC) Algorithms and Architectures; Aug. 2014; pp. 49-90.
Budagavi, M., et al.; "HEVC Transform and Quantization;" High Efficiency Video Coding (HEVC): Algorithms and Architectures; Aug. 2014; pp. 141-169.
Boyce, J., et al.; "Draft high efficiency video coding (HEVC) version 2, combined format range extensions (RExt), scalability (SHVC), and multi-view (MV-HEVC) extensions;" Joint Collaborative Team on Video Coding (JCT-VC) of ITU-T SG 16 WP 3 and ISO/IEC JTC 1/SC 29/WG 11; Jul. 2014; pp. 1-533.

* cited by examiner

METHODS AND APPARATUS OF ALTERNATIVE TRANSFORM SKIP MODE FOR IMAGE AND VIDEO CODING

CROSS REFERENCE TO RELATED APPLICATIONS

The present invention claims priority to U.S. Provisional Patent Application, Ser. No. 62/661,663, filed on Apr. 24, 2018, U.S. Provisional Patent Application, U.S. Provisional Patent Application, Ser. No. 62/675,235, filed on May 23, 2018, and Ser. No. 62/792,388, filed on Jan. 14, 2019. The U.S. Provisional Patent Applications are hereby incorporated by reference in their entireties.

FIELD OF THE INVENTION

The present invention relates to transform coding process in video coding. In particular, the present invention discloses a video coding method that skips the transform coding process for at least one of final smaller TU (transform unit) blocks partitioned from a current block.

BACKGROUND AND RELATED ART

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU (i.e., no splitting) or can be split into four smaller units of equal sizes (i.e., M/2×M/2 each), which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set). This representation results in a recursive structure as specified by a coding tree (also referred to as a partition tree structure) 120 in FIG. 1. The CTU partition 110 is shown in FIG. 1, where the solid lines indicate CU boundaries. The decision whether to code a picture area using Inter-picture (temporal) or Intra-picture (spatial) prediction is made at the CU level. Since the minimum CU size can be 8×8, the minimum granularity for switching between different basic prediction types is 8×8.

Furthermore, according to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU, including 2N×2N, 2N×N, N×2N, N×N, 2N×nU, 2N×nD, nL×2N and nR×2N partition types. Unlike the CU, the PU may only be split once according to HEVC. The partitions shown in the second row correspond to asymmetric partitions, where the two partitioned parts have different sizes.

After obtaining the residual block by the prediction process based on PU splitting type, the prediction residues of a CU can be partitioned into transform units (TUs) according to another quadtree structure, which is analogous to the coding tree for the CU as shown in FIG. 1. The solid lines indicate CU boundaries and dotted lines indicate TU boundaries. The TU is a basic representative block having residual or transform coefficients for applying the integer transform and quantization. For each TU, one integer transform having the same size to the TU is applied to obtain residual coefficients. These coefficients are transmitted to the decoder after quantization on a TU basis.

The terms coding tree block (CTB), coding block (CB), prediction block (PB), and transform block (TB) are defined to specify the 2-D sample array of one colour component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

Alternatively, a binary tree block partitioning structure is proposed in JCTVC-P1005 (D. Flynn, et al, "HEVC Range Extensions Draft 6", Joint Collaborative Team on Video Coding (JCT-VC) of ITU-T SG 16 WP 3 and ISO/IEC JTC 1/SC 29/WG 11, 16th Meeting: San Jose, US, 9-17 Jan. 2014, Document: JCTVC-P1005). In the proposed binary tree partitioning structure, a block can be recursively split into two smaller blocks using various binary splitting types as shown in FIG. 2. The most efficient and simplest ones are the symmetric horizontal and vertical splits as shown in the top two splitting types in FIG. 2. For a given block of size M×N, a flag is signalled to indicate whether the given block is split into two smaller blocks. If yes, another syntax element is signalled to indicate which splitting type is used. If the horizontal splitting is used, the given block is split into two blocks of size M×N/2. If the vertical splitting is used, the given block is split into two blocks of size M/2×N. The binary tree splitting process can be iterated until the size (width or height) for a splitting block reaches a minimum allowed block size (width or height). The minimum allowed block size can be defined in high level syntax such as SPS. Since the binary tree has two splitting types (i.e., horizontal and vertical), the minimum allowed block width and height should be both indicated. Non-horizontal splitting is implicitly implied when splitting would result in a block height smaller than the indicated minimum. Non-vertical splitting is implied implicitly when splitting would result in a block width smaller than the indicated minimum.

In a video coding system that supports various partition types, the computational complexity may be high. It is desirable to reduce computational complexity associated with transform coding process.

BRIEF SUMMARY OF THE INVENTION

A method and apparatus for video coding using block partition are disclosed. According to the present invention, a partition structure corresponding to recursively partitioning a current block into smaller TU (transform unit) blocks until the partition structure reaches a maximum allowed split depth or until a block size of at least one of smaller TU blocks is a supported core transform size, where the current block is partitioned into final smaller TU blocks according to the partition structure. A transform coding process is applied to the current block according to the partition structure, where the transform coding process is skipped for at least one of the final smaller TU blocks.

In one embodiment, a flag is signalled for the current block to indicate whether the current block is allowed to skip the transform coding process for said at least one of the final smaller TU blocks. If the flag indicates that the current block is allowed to skip the transform coding process for said at least one of the final smaller TU blocks, an indicator is further signalled explicitly or inferred implicitly for each of the final smaller TU blocks to indicate whether the transform coding process is skipped or not for said each of the final smaller TU blocks. If all the final smaller TU blocks except for the last TU block are skipped for the transform coding process, then the last TU block is implicitly inferred as non-skipping for the transform coding process. If all the final smaller TU blocks except for a last TU block are not skipped for the transform coding process, then the last TU block is implicitly inferred as skipping for the transform coding process. The flag can be determined according to a block size or an aspect ratio of the current block.

In one embodiment, the maximum allowed split depth is equal to 1. The partition structure can be generated using restricted partitions consisting of symmetric horizontal binary partition, symmetric vertical binary partition, asymmetric horizontal binary partition, and asymmetric vertical binary partitioning.

In one embodiment, a first flag is signalled for the current block to indicate whether the current block is allowed to skip the transform coding process for at least one of the final smaller TU blocks. If the first flag indicates that the current block is allowed to skip the transform coding process for at least one of the final smaller TU blocks, then only binary or ternary partitioning types are used to generate the partition structure and a second flag can be signalled to indicate a partition direction for said binary or ternary partitioning types. A third flag can be signalled to indicate a split type for said only binary or ternary partitioning types, where the split type corresponds to symmetric binary split, asymmetric binary split or ternary split. An indicator can be further signalled explicitly or inferred implicitly for each of the final smaller TU blocks to indicate whether the transform coding process is skipped or not for said each of the final smaller TU blocks.

In another embodiment, a flag is signalled in VPS (Video Parameter Set), SPS (Sequence Parameter Set), PPS (Picture Parameter Set), slice header, or CU (Coding Unit) for corresponding blocks in a respective video, sequence, picture, slice or CU to indicate whether the corresponding blocks are allowed to skip the transform coding process for at least one of final smaller TU blocks in the corresponding blocks. The flag can be determined according to a coding mode associated with a corresponding picture, slice, CU or PU (prediction Unit), where the coding mode belongs to a group comprising Inter coding and Intra coding. The flag may also be determined according to a colour component associated with a corresponding picture, slice, CU or PU (prediction Unit), where the colour component belongs to a group comprising luma and chroma components, or Red, Green and Blue components.

In one embodiment, if a block size of a target final smaller TU block is not a supported transform size, the target final smaller TU block is implicitly inferred to skip the transform coding process. In this case, then residuals of the target smaller TU block are implicitly inferred to be 0.

In one embodiment, when the transform coding process is skipped for a target final smaller TU block, residuals can be set to 0 for the target final smaller TU block, and entropy coding, quantization and transform process are not applied to the target final smaller TU block. In another embodiment, when a maximum number of available partitioning types is M, only N out of M available partition types are used to partition the current block, where M and N are integers and M≥N.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In the present invention, a coding mode named as "Alternative Transform Skip (ATS)" mode is proposed to improve the TU partition for higher coding efficiency or less encoder complexity.

Method 1: Alternative Transform Skip (ATS) Mode

Figure 1:
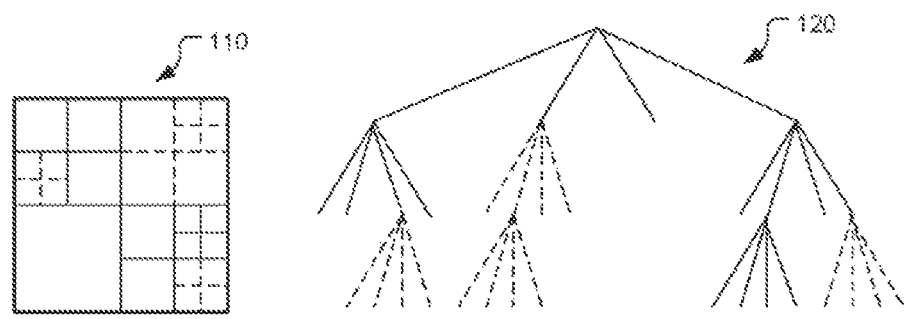
FIG. 1 illustrates an example of block partition, where a block partitioned result is shown on the left and a coding tree (also referred to as a partition tree structure) is shown on the right.
Figure 2:
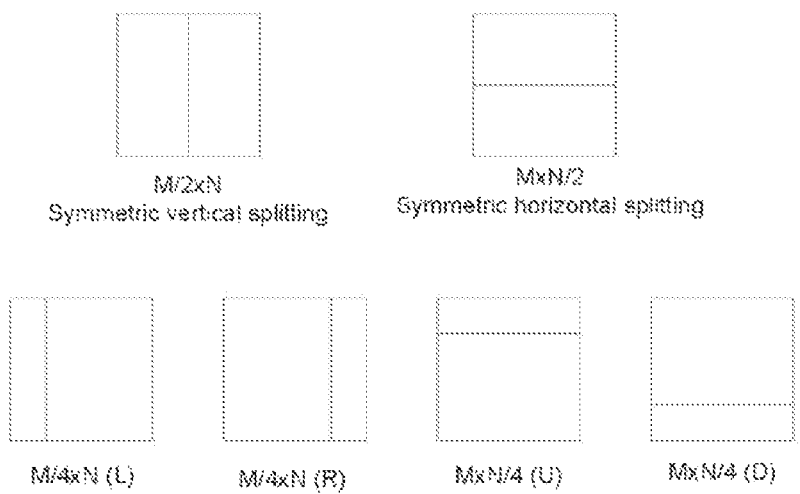
FIG. 2 illustrates examples of binary partition types including the symmetric horizontal and vertical splits and asymmetric horizontal and vertical splits.
Figure 3:
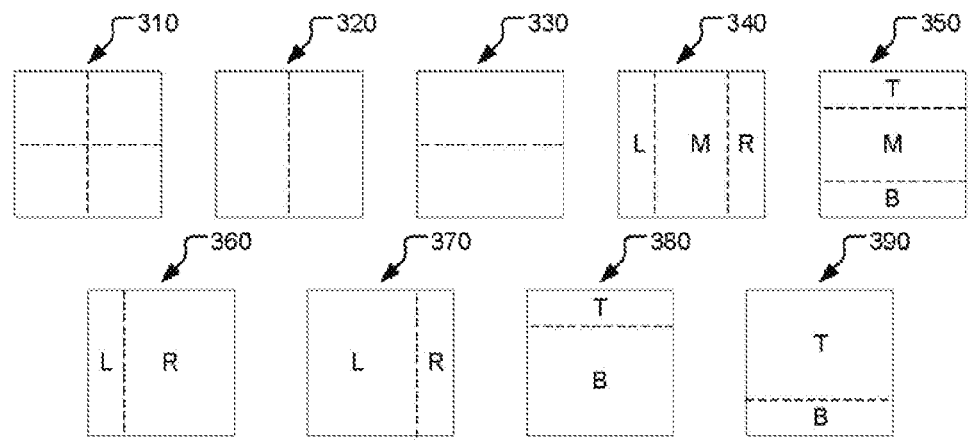
FIG. 3 illustrates examples of partition types including quad-tree partition, vertical binary-tree partition, horizontal binary-tree partition, vertical centre-side ternary-tree partition, horizontal centre-side ternary-tree partition, vertical-left asymmetric tree partition 360, vertical-right asymmetric tree partition, horizontal-top asymmetric tree partition 380, and horizontal-bottom asymmetric tree partition.

When the proposed ATS mode is applied to a block, a block is recursively partitioned into smaller TU blocks until it reaches the maximum allowed split depth or at least one of smaller TU block size is a supported core transform size. After the block partition process is finished, the smaller TU blocks resulted from the block partition are also referred as final smaller TU blocks. When this condition is reached, at least one of the smaller TU blocks is selected for skipping the transform coding process. There are different partition types for splitting a block into smaller blocks as shown in FIG. 3, including quad-tree partition 310, vertical binary-tree partition 320, horizontal binary-tree partition 330, vertical centre-side ternary-tree partition 340, horizontal centre-side ternary-tree partition 350, vertical-left asymmetric tree partition 360, vertical-right asymmetric tree partition 370, horizontal-top asymmetric tree partition 380, and horizontal-bottom asymmetric tree partition 390. In one embodiment, a flag is firstly assigned to indicate whether the proposed ATS mode is applied to a block or not. If yes, one of allowed partitioning types is used to partition a block into smaller TU blocks. The partition process is applied recursively to the smaller TU blocks resulted from partition. Another syntax element is recursively signalled to indicate which partitioning type is used. According to an embodiment of the present invention, for each smaller TU, an indicator is explicitly or implicitly inferred to indicate whether the transform coding process of each smaller TU block is skipped or not. Note that, if a smaller TU block size is not a supported transform size, then the smaller TU block is implicitly inferred to skip the transform coding process. Besides, if all the smaller TU blocks excluding the last TU block are transform-skipped, then the last TU block is implicitly infer as non-transform-skipped. Similarly, if all the smaller TU blocks excluding the last TU block are non-transform-skipped, then the last TU block is implicitly inferred as transform-skipped.

For a simplified design, the maximum allowed split depth is set to 1, and the residuals of the transform-skipped block are all set to 0 (i.e., skip entropy coding, quantization, and transform coding processes of residuals). In one embodiment, a flag is assigned firstly to indicate whether the proposed ATS mode is applied to a block or not. If yes, one of allowed partitioning types is used to partition a block into smaller TU blocks, and another syntax element is signalled to indicate which partitioning type is used. For each smaller TUs, an indicator is explicitly assigned or implicitly inferred whether the residuals are all set to 0 or not. Also, if a smaller TU block size is not a supported transform size, then the residuals of the smaller TU block is implicitly inferred to 0.

In another simplified design according to an embodiment of the present invention, if the proposed ATS mode is applied and one of the symmetric horizontal binary, symmetric vertical binary, asymmetric horizontal binary, or asymmetric vertical binary partitioning types is selected, after indicating the partitioning type, only the last smaller TU block is always implicitly inferred to indicate whether the transform coding process is skipped or not.

In another simplified design according to an embodiment of the present invention, the maximum number of allowed partitioning types is limited to N. That is, even the number of all the available partitioning types is M(M≥N), but only N out of M types are allowed. For example, in an embodiment, if the proposed ATS mode is applied, then a candidate list is filled up according to a predefined partitioning type insertion order (e.g., symmetric binary, ternary, and then asymmetric binary partitioning type). In one example, only the first N partitioning types of the candidate list are allowed for partitioning a block into smaller TU blocks. A syntax element is then signalled to indicate the candidate list index for the partition type. Finally, an indicator is explicitly or implicitly inferred to indicate whether the transform coding process of each smaller TU block is skipped or not.

In another simplified design according to an embodiment of the present invention, a flag is firstly assigned to indicate whether the proposed ATS mode is applied to a block or not. If the proposed ATS mode is applied and only binary or ternary partitioning types are used, then a flag is used to indicate the split direction (i.e., horizontal or vertical split). Furthermore, another flag is used to indicate the split type (i.e., symmetric binary, asymmetric binary or ternary split). Finally, an indicator is explicitly or implicitly inferred to indicate whether the transform coding process of each smaller TU block is skipped or not.

Besides, if the proposed ATS mode is applied, the order of indicators to indicate whether the smaller TU blocks are allowed for transform-skipping always follows the block coding order. For example, as an embodiment, the order of indicators can be horizontal scanning order, vertical scanning order, horizontal traverse scanning order, vertical traverse scanning order, or z-scan scanning order. As another embodiment, the order of indicators can depend on the partitioning type. As still another embodiment, the order of indicators is implicitly indicated.

Whether to apply the proposed ATS mode may depend on many factors. In one embodiment, at least one flag is signalled in VPS (Video Parameter Set), SPS (Sequence Parameter Set), PPS (Picture Parameter Set), slice header, or CU (Coding Unit) to indicate whether the proposed ATS mode is enabled for a CU/PU/TU block or not. In another embodiment, whether to apply the proposed ATS mode may depend on the coding mode (e.g. Inter/Intra coding) of the current picture/slice/CU/PU. In one embodiment, the proposed ATS mode is enabled when the current CU is Inter-coded. In still another embodiment, whether to apply the proposed ATS mode may depend on the colour component (e.g. Luma/Chroma or R/G/B colour components) of the current picture/slice/CU/PU. In yet another embodiment, the proposed ATS mode is enabled when the colour component of the current slice is Luma. In still yet another embodiment, whether to apply the proposed ATS mode may depend on the block size or the aspect ratio of the block. In still yet another embodiment, the proposed ATS mode is enabled when both the block width and height are equal to or smaller than 64. In another embodiment, the proposed ATS mode is enabled when the block size ratio is smaller than 1:4 or 4:1.

Method 2: ATS Mode with Subsampling, Down-Sampling or Up-Sampling

The proposed ATS mode can also be realized by subsampling, down-sampling or up-sampling residuals to another supported core transform size before transform coding. To reconstruct the residuals, after inverse transform coding, the residuals are restored to the original size by inserting zero samples, up-sampling or down-sampling samples.

Figure 4:
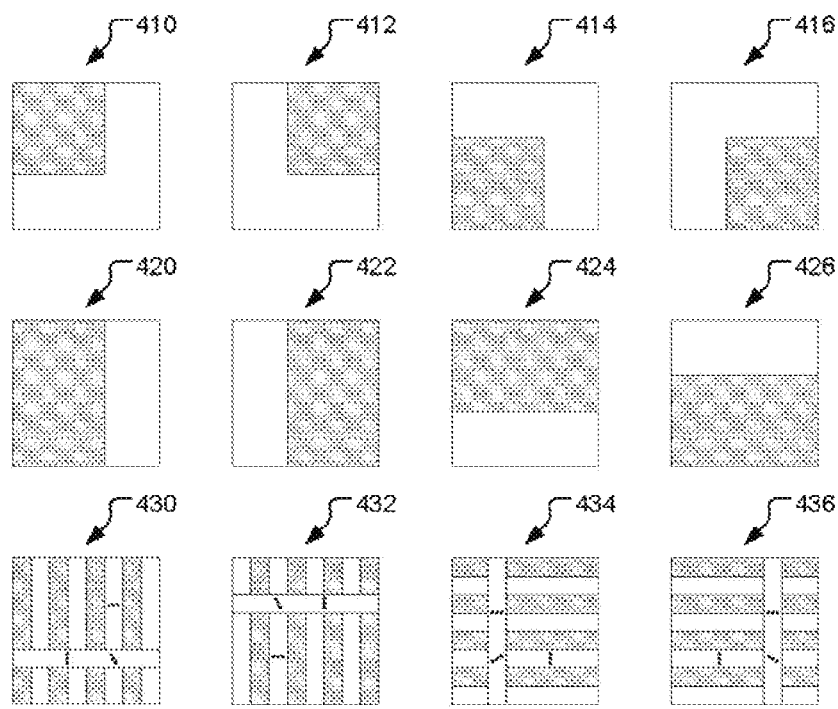
FIG. 4 illustrates examples of the residual subsampling using predefined subsampling patterns.

In one embodiment, the residual subsampling can be used. One direction or both two directions of residual can be subsampled to another supported core transform size by one of predefined subsampling patterns as shown in FIG. 4. In FIG. 4, pattern 410 corresponds to an upper-left side pattern; pattern 412 corresponds to an upper-right side pattern; pattern 414 corresponds to a below-left side pattern; pattern 416 corresponds to a below-right side pattern; pattern 420 corresponds to a left side pattern; pattern 422 corresponds to a right side pattern; pattern 424 corresponds to a upper side pattern; pattern 426 corresponds to a below side pattern; pattern 430 corresponds to a multi-columns with left-side columns pattern; pattern 432 corresponds to a multi-columns with right-side columns pattern; pattern 434 corresponds to a multi-rows with upper-side rows pattern; and pattern 436 corresponds to a multi-rows with below-side rows pattern. The residuals at gray locations are kept to apply transform coding and the residuals at white locations are forced to be 0. To reconstruct the residual block, after applying inverse transform, zeros-samples are padded to the residuals to restore the original block size. The selected subsampling patterns may be explicitly signalled in the bitstream or derived using the pre-defined methods. Selection or derivation of subsampling patterns may depend on the shape and/or size of the current block or the related information from the neighbouring coded blocks. For example, if the proposed ATS mode is applied to a given 12×8 TU, then a syntax element is used to indicate which predefined subsampling pattern is used. Assume the used pattern is pattern 420, then the right-side 4×8 residuals are forced to be 0, and only apply 8×8 transform to the left-side 8×8 residuals. To reconstruct the 12×8 residual block, an 8×8 inverse transform is applied, and then the left side of the 8×8 residual is extended by padding a 4×8 zeros-samples for restoring to a 12×8 residual block.

In another embodiment, the residual down-sampling can be used. One direction or both directions of residual can be down-sampled to a size equal to a power-of-2 number. For example, the size can be the nearest power of 2 number that is smaller than the original size. For example, if a TU size is equal to 12×8 (width=12, height=8), the x-direction residual can be down-sampled to 8-samples per rows before performing the transform. In other words, a 12×8 TU is first down-sampled to an 8×8 TU, then an 8×8 transform is applied. To reconstruct the residual, an 8×8 inverse transform is applied, and then the 8×8 residual is up-sampled to be a 12×8 residual block. In another example, if a TU size is equal to 12×12, the 12×12 residual block is down-sampled to an 8×8 block and then an 8×8 transform is performed.

In still another embodiment, the residual up-sampling can be used. One direction or both two directions of residual can be up-sampled to a size equal to a power-of-2 number. For example, the size can be the nearest power-of-2 number that is larger than the original size. For example, if a TU size is equal to 12×8 (width=12, height=8), the x-direction residual can be up-sampled to 16 samples per rows before performing the transform. In another word, a 12×8 TU is first up-sampled to a 16×8 TU, and then a 16×8 transform is applied. To reconstruct the residual, a 16×8 inverse transform is applied, and then the 16×8 residual is down-sampled to a 12×8 residual block. In another example, if a TU size is equal to 12×12, the 12×12 residual block is up-sampled to a 16×16 block then a 16×16 transform is performed.

Method 3: Selective ATS Mode

The split mode for sub-block transform can be quad-tree split, binary split, ternary tree, or other split mode mentioned in the above two methods. For each split direction, one sub-block will be selected for the transform processing. That is, only the residual in the selected sub-block will go through the transform process. The coefficients in the non-selected sub-blocks are all equal to 0. This requires one or more syntax to indicate which partition type and which sub-block are selected to be the transform block.

Figure 5:
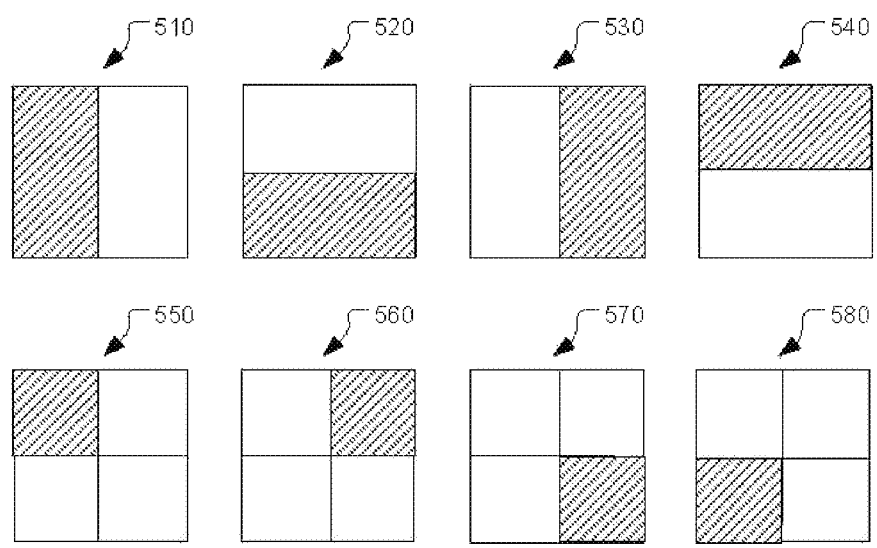
FIG. 5 illustrates examples of the selective ATS mode for sub-blocks of various transform types.

In one embodiment, only binary split is allowed, as shown in FIG. 5. The syntax indicating which sub-block is selected as the transform block can be spared or modified based on the last coefficient's position. In one example, when the current TU is further split by a horizontal split, and the last coefficient's position is located in the position (xLast, yLast), where xLast and yLast are the horizontal and vertical position of the last significant coefficient. If the yLast is smaller than CU_height/2, then the selected sub-partition is inferred to be the above one (i.e., transform type 540 in FIG. 5); otherwise, the selected sub-block is inferred to be the bottom one i.e., transform type 520 in FIG. 5). In another example, when current TU is further split by a vertical split, and if the xLast is smaller than CU_width/2 then the selected sub-block is inferred to be the left one (i.e., transform type 510 in FIG. 5); otherwise, the selected sub-block is inferred to be the right one (i.e., transform type 530 in FIG. 5).

In one embodiment, both binary split and quad-tree split are allowed, as shown by transform types 510 through 580 in FIG. 5. The syntax indicating which sub-block is selected as the transform block can be spared or modified based on the last coefficient's position. In one example, when current TU is further split by a horizontal split, and the last coefficient's position is (xLast, yLast). If the yOffset is smaller than CU_height/2, then the selected sub-block is inferred to be the above one (i.e., transform type 540 in FIG. 5); otherwise, the selected sub-block is inferred to be the bottom one (i.e., transform type 520 in FIG. 5). In one example, when current TU is further split by vertical split, if the xLast is smaller than CU_width/2 then the selected sub-partition is inferred to be the left one (i.e., transform type 510 in FIG. 5); otherwise, the selected sub-partition is inferred to be the right one (i.e., transform type 530 in FIG. 5). In another example, when current TU is further split by a quad-tree split, if the xLast is smaller than CU_width/2 and yLast is smaller than CU_height/2, then the selected sub-block is inferred to be the above-left one (i.e., transform type 550 in FIG. 5); otherwise, if the xLast is larger than or equal to CU_width/2 and yLast is smaller than CU_height/2, then the selected sub-block is inferred to be the above-right one (i.e., transform type 560 in FIG. 5), otherwise, if the xLast is smaller than CU_width/2 and yLast is larger than or equal to CU_height/2, then the selected sub-partition is inferred to be the bottom-left one (i.e., transform type 580 in FIG. 5); otherwise, if the xLast is larger than or equal to CU_width/2 and yLast is larger than or equal to CU_height/2, then the selected sub-partition is inferred to be the bottom-right one (i.e., transform type 570 in FIG. 5).

When the selected transform sub-block can be inferred, the syntax indicating which sub-block is selected to be the transform sub-block is spared.

In another embodiment, the index of sub-block transform types 510 through 580 in FIG. 5 is signalled. One or more syntaxes (e.g. an index ranging from 0 to 7) is signalled to indicate which sub-block transform type is used. To reduce the overhead for the syntax, the syntaxes indicating the sub-block transform type can be reduced according to the last coefficient's position. In one example, the last coefficient's position is located in the position (xLast, yLast), where xLast and yLast are the horizontal and vertical position of the last significant coefficient. If xLast is less than CU_width/2, and yLast is less than CU_height/2, then only sub-block transform types 510, 540 and 550 in FIG. 5 can be selected, which results in a reduced range of the index for partition type between 0 to 2. If xLast is larger than or equal to CU_width/2, and yLast is less than CU_height/2, then only sub-block transform types 530, 540, and 560 can be selected, which results in a reduced range of the index for partition type is between 0 to 2. If xLast is less than CU_width/2, and yLast is larger than or equal to CU_height/2, then only sub-block transform types 510, 520, and 580 can be selected, which results in a reduced range of the index for partition type between 0 to 2. If xLast is larger than or equal to CU_width/2, and yLast is larger than or equal to CU_height/2, then only sub-block transform types 520, 530, and 570 can be selected, which results in a reduced range of the index for partition type between 0 to 2.

In another embodiment, only transform sub-block types containing DC coefficient are allowed. That is, only transform type 510, 540, and 550 in FIG. 5 are allowed. A syntax ranging from 0 to 2 is used to indicate which sub-block transform type is selected. The range of this syntax can be reduced according to the last coefficient's position. For example, if xLast is larger than or equal to CU_width/2, and yLast is less than CU_height/2, then the sub-block transform type is inferred to be type 540 in FIG. 5. If xLast is less than CU_width/2, and yLast is larger than or equal to CU_height/ 2, then the sub-block transform type is inferred to be type 510 in FIG. 5. In another embodiment, the whole CU can be transformed by a large TU, and the patterns in FIG. 4 or FIG.

5 that include the DC coefficient can be used for the coefficient scan. For example, pattern 540 in FIG. 5 means only the upper part of the TU need to be scanned. Pattern 550 in FIG. 5 means only the upper-left part of the TU need to be scanned. In one example, the scan pattern of whole TU, i.e., patterns 510, 540 and 550 in FIG. 5 are used. The last significant coefficient position is first signalled. If the xLast is larger than width/2 and yLast is smaller than height/2, pattern 540 may be selected. One or more syntaxes are used to indicate whether scan pattern 540 in FIG. 5 is used or not. If the xLast is larger than width/2 and the yLast is larger than height/2, only the whole TU scan can be used. If the xLast is smaller than width/2 and yLast is smaller than height/2, the whole TU scan, patterns 510, 540 and 550 in FIG. 5 can be used. One or more syntaxes can be used to indicate which scan pattern is used. In another example, one or more syntax can be used to indicate whether the whole TU scan or the pattern 550 in FIG. 5 is used. In another example, only the whole TU scan can be used.

Method 4: ATS Mode and Sign Flag Coding

When transform skip is applied for the current TU, the sign flags coding can be modified as follows.

According to this method a syntax indicating whether the sign values of the coefficients in a predefined region are the same. If the syntax is true, then another syntax will be used to indicate the sign value (i.e., + or −); otherwise, the original method is applied.

In one embodiment, for each TU, one syntax is used to indicate whether the sign values of the coefficients the whole TU are the same. If the syntax is true, then another syntax will be used to indicate the sign value i.e., (+ or −); otherwise, the original method is applied.

In another embodiment, for each 4×4 coefficient group in one TU, one syntax is used to indicate whether the sign values of the coefficients the 4×4 coefficient group are the same. If the syntax is true, then another syntax will be used for the 4×4 coefficient group to indicate the sign value (i.e., + or −); otherwise, the original method is applied.

In another embodiment, for each TU, one syntax is used to indicate whether the sign values in the whole TU are the same. If the syntax is true, then another syntax will be used to indicate the sign value (i.e., + or −); otherwise, for each 4×4 coefficient group, one syntax will be used to indicate whether the sign values in the 4×4 coefficient group are the same. If the syntax is true, then another syntax will be used for the 4×4 coefficient group to indicate the sign values (i.e., + or −); otherwise, the original method is applied.

In another embodiment, for each TU, a first syntax is used to indicate whether the sign values in the whole TU are the same. If the first syntax is true, then a second syntax will be used to indicate the sign value (i.e., + or −); otherwise, a third syntax will be used to indicate whether each 4×4 coefficient group has a fourth syntax for indicating whether the sign values in that 4×4 coefficient block are the same. If the third syntax is true, then for each 4×4 coefficient group, the fourth syntax will be used to indicate whether the sign values in that 4×4 coefficient block are the same. If the fourth syntax is true, then a fifth syntax will be used to indicate the sign value (i.e., + or −); otherwise, the original method is applied.

In another embodiment, for each TU, a first syntax is used to indicate whether each 4×4 coefficient group has a second syntax to indicate whether the sign values in that 4×4 coefficient block are the same. If the second syntax is true, then for each 4×4 coefficient group, a third syntax will be used to indicate whether the sign values in that 4×4 coefficient block are the same. If the third syntax is true, then a fourth syntax will be used to indicate the sign value (i.e., + or −); otherwise, the original method is applied.

Method 5: ATS and the Reduced Maximum Transform Size

A video coder may utilize large size coding units coupled with large size transforms for high-resolution video applications. The HEVC standard can support the CTU size up to 64×64 luma samples and the transform block size up to 32×32 samples. In JEM, the supported CTU size can up to 256×256 luma samples and the supported transform unit size can up to 128×128 luma samples. However, the implementation complexity and computational costs associated with the transform processing tend to increase significantly with an increase in transform size. A video coder may therefore choose to adopt the reduced maximum transform size for coding video data in order to lower coding complexity.

In HEVC, the CTU size in units of luma samples and the maximum transform block size can be specified in the SPS. The maximum CU size is the same as the specified CTU size. When the current transform unit size is greater than the specified maximum transform block size, the current transform unit is forced to be split into four quarter-sized TUs. The associated syntax "split_transform_flag" for indicating whether to split the current TU is not coded and inferred to be equal to 1.

In the JEM, the CTU size in units of luma samples can be specified in the SPS and the maximum TU size in both width and height is pre-determined to be equal to 128 luma samples. Each CTU can be further divided into multiple CUs using the recursive partitioning structure. The coding unit is also employed as a basic unit for both prediction and transforms processing without further partitioning. Therefore, the maximum CU size is the same as the maximum TU size. When the width or the height of the current CU in units of luma samples is greater than the maximum TU size, the current CU is forced to be split into four quarter-sized CUs. If a video coder choose to adopt a reduced maximum TU size, the maximum CU size shall be reduced accordingly, which may lead to a loss in compression efficiency for the resulting bitstream.

This method relates to processing non-square CUs with width or height larger than the specified threshold. Non-square CUs can be generated by binary tree partition or multi-type-tree partition. The width or height of one non square CU may larger than the specified maximum transform size, and the ratio of width/height can be 1:2, 1:4, 1:8, 1:16, 2:1, 4:1, 8:1, 16:1, and so on, depending on the split direction and depth of binary tree partition or multi-type-tree partition. When the width or height of one non-square CU is larger than the specified threshold, this CU can be implicitly further split into more than one TU with size equal to or smaller than the specified threshold.

In one embodiment, recursive binary transform is proposed. Recursive binary transform partitions one non-square CU into two TUs recursively. When current CU width is larger than or equal to current CU_height, then two TUs with size equal to Width/2×Height are split by using recursive binary transform. If current CU width is smaller than current CU_height, then the split TU size is equal to Width×Height/2. This process is recursively performed until the split TU width and height are equal to or smaller than the specified threshold. In another embodiment, one non-square CU with width or height larger than the specified threshold will be partitioned into several square TUs with size equal to min(Width, Height)×min(Width, Height), first. And for each TU, it will be further split by using RQT, if its' size is larger than the specified threshold. In another embodiment, RQT is also used for non-square CUs. The split TU size is Width/2×Height/2 first, and each TU can be further split until the split TU width and height are equal to or smaller than the specified threshold.

In another embodiment, the specified threshold can be pre-defined based on video resolution or compression profile, or signalled at sequence level, picture level, or slice level. It also can be the specified max transform size. For those CU with size smaller than or equal to the specified maximum transform size, only one TU in one CU is allowed.

In another embodiment, the proposed methods can be applied on square CUs.

In another embodiment, the proposed methods can be further combined with the residual subsampling/upsampling process before transform and quantization. The residual subsampling/upsampling process before transform and quantization is another method to deal with the case of CUs with size larger than the supported transform size. When the CU size is larger than the supported transform, subsampling is applied on the residual first, the subsampled residual is processed by transform and quantization, and the quantized signals are encoded in the bitstream. At the decoder side, the quantized signals are decoded from the bitstream and followed by the inverse quantization and inverse transform. Next, the reconstructed residual are upsampled to the original resolution. In the following, one example is taken. Assume the CU size is 128×128 and the supported maximum transform size is 32×32. So the current residual block is 128×128. Then before transform, subsampling process is applied on the current residual block with size equal to 128×128 and one subsampled residual block with size equal to 32×32 is generated and followed by the process of transform and quantization. And the quantized data are coded in the bitstream at the encoder. At the decoder, the quantized data are decoded from the bitstream first and processed by inverse quantization and inverse transform. So one 32×32 residual block is reconstructed, and this block is further upsampled to 128×128. This process can be combined with the above proposed method.

In one embodiment, when current CU size is larger than the specified threshold, current CU is split into more than one TU first by using the above method first, and each TU is further processed by the subsampling/upsampling process before transform and quantization if the CU size is larger than the maximum transform size. For example, assume the CU size is 128×128 and the supported maximum transform size is 32×32. A 128×128 CU is further split into four 64×64 TUs first. And for each 64×64 TU, the subsampling process is applied to generate one 32×32 subsampled block. The 32×32 subsampled block is processed by transform and quantization and the quantized data are coded in the bitstream. By combining these two methods, the ratio of subsampling and upsampling process can be reduced to save more information in these two processes. The specified threshold and the supported ratio of subsampling and upsampling process can be pre-defined based on video resolution or compression profile, or signaled at sequence level, picture level, or slice level.

Any of the foregoing proposed methods can be implemented in encoders and/or decoders. For example, any of the proposed methods can be implemented in an Inter/Intra/prediction/transform module of an encoder, and/or an Inter/Intra/prediction/inverse-transform module of a decoder. Alternatively, any of the proposed methods can be implemented as a circuit coupled to the Inter/Intra/prediction/transform module of the encoder and/or the Inter/Intra/prediction/inverse-transform module of the decoder to provide the information needed by the Inter/Intra/prediction/transform/inverse-transform module.

Figure 6:
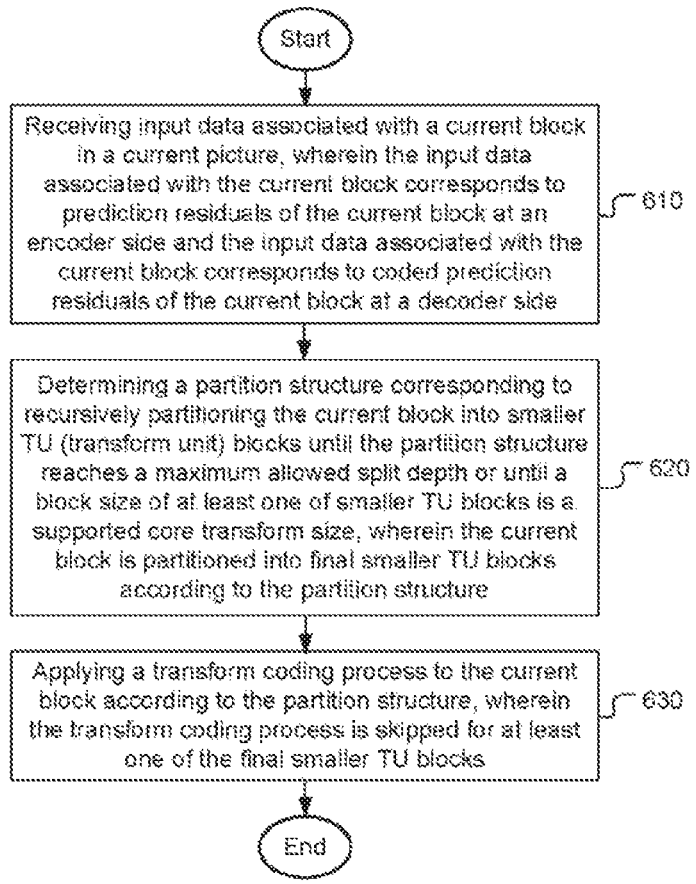
FIG. 6 illustrates a flowchart of an exemplary coding system incorporating Alternative Transform Skip (ATS) according to an embodiment of the present invention.

FIG. 6 illustrates a flowchart of an exemplary coding system incorporating Alternative Transform Skip (ATS) according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data associated with a current block in a current picture is received in step 610, where the input data associated with the current block corresponds to prediction residuals of the current block at an encoder side and the input data associated with the current block corresponds to coded prediction residuals of the current block at a decoder side. A partition structure corresponding to recursively partitioning the current block into smaller TU (transform unit) blocks until the partition structure reaches a maximum allowed split depth or until a block size of at least one of smaller TU blocks is a supported core transform size is determined in step 620, where the current block is partitioned into final smaller TU blocks according to the partition structure. A transform coding process is applied to the current block according to the partition structure in step 630, where the transform coding process is skipped for at least one of the final smaller TU blocks.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention. Embodiment of the present invention as described above may be implemented in a video encoder and a video decoder. The components of the video encoder and video decoder may be implemented by hardware components, one or more processors configured to execute program instructions stored in a memory, or a combination of hardware and processor. For example, a processor executes program instructions to control receiving of input data associated with a video sequence including a current block in a current picture. The processor is equipped with a single or multiple processing cores. In some examples, the processor executes program instructions to perform functions in some components in the encoder and the decoder, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding used by a video coding system, the method comprising:
   receiving input data associated with a current block in a current picture, wherein the input data associated with the current block corresponds to prediction residuals of the current block at an encoder side and the input data associated with the current block corresponds to coded prediction residuals of the current block at a decoder side;
   determining a partition structure corresponding to partition the current block into a plurality of smaller TU (transform unit) blocks when the partition structure is less than or equal to a maximum allowed split depth or when a block size of at least one of smaller TU blocks is a supported core transform size, wherein the current block is partitioned into final smaller TU blocks according to the partition structure; and
   applying a transform coding process to the current block according to the partition structure, wherein the transform coding process is skipped for at least one of the final smaller TU blocks;
   wherein a flag is signalled for the current block to indicate whether the current block is allowed to skip the transform coding process for said at least one of the final smaller TU blocks;
   wherein if the flag indicates that the current block is allowed to skip the transform coding process for said at least one of the final smaller TU blocks, an indicator is signalled explicitly or inferred implicitly for each of the final smaller TU blocks to indicate whether the transform coding process is skipped or not for said each of the final smaller TU blocks;
   wherein if all the final smaller TU blocks except for a last TU block are skipped for the transform coding process, then the last TU block is implicitly inferred as non-skipping for the transform coding process.

2. The method of claim 1, wherein if all the final smaller TU blocks except for a last TU block are not skipped for the transform coding process, then the last TU block is implicitly inferred as skipping for the transform coding process.

3. The method of claim 1, wherein the flag is determined according to a block size or an aspect ratio of the current block.

4. The method of claim 1, wherein the maximum allowed split depth is equal to 1.

5. The method of claim 1, wherein the partition structure is generated using restricted partitions consisting of symmetric horizontal binary partition, symmetric vertical binary partition, asymmetric horizontal binary partition, and asymmetric vertical binary partition.

6. The method of claim 1, wherein a first flag is signalled for the current block to indicate whether the current block is allowed to skip the transform coding process for at least one of the final smaller TU blocks.

7. The method of claim 6, wherein if the first flag indicates that the current block is allowed to skip the transform coding process for at least one of the final smaller TU blocks, then only binary or ternary partitioning types are used to generate the partition structure and a second flag is signalled to indicate a partition direction for said binary or ternary partitioning types.

8. The method of claim 7, wherein a third flag is signalled to indicate a split type for said only binary or ternary partitioning types, wherein the split type corresponds to symmetric binary split, asymmetric binary split or ternary split.

9. The method of claim 8, wherein an indicator is signalled explicitly or inferred implicitly for each of the final smaller TU blocks to indicate whether the transform coding process is skipped or not for said each of the final smaller TU blocks.

10. The method of claim 1, wherein a flag is signalled in VPS (Video Parameter Set), SPS (Sequence Parameter Set), PPS (Picture Parameter Set), slice header, or CU (Coding Unit) for corresponding blocks in a respective video, sequence, picture, slice or CU to indicate whether the corresponding blocks are allowed to skip the transform coding process for at least one of final smaller TU blocks in the corresponding blocks.

11. The method of claim 10, wherein the flag is determined according to a coding mode associated with a corresponding picture, slice, CU or PU (prediction Unit), wherein the coding mode belongs to a group comprising Inter coding and Intra coding.

12. The method of claim 10, wherein the flag is determined according to a colour component associated with a corresponding picture, slice, CU or PU (prediction Unit), wherein the colour component belongs to a group comprising luma and chroma components, or Red, Green and Blue components.

13. The method of claim 1, wherein if a block size of a target final smaller TU block is not a supported transform size, the target final smaller TU block is implicitly inferred to skip the transform coding process.

14. The method of claim 13, wherein then residuals of the target smaller TU block are implicitly inferred to be 0.

15. The method of claim 1, wherein when the transform coding process is skipped for a target final smaller TU block, residuals are set to 0 for the target final smaller TU block, and entropy coding, quantization and transform process are not applied to the target final smaller TU block.

16. The method of claim 1, wherein when a maximum number of available partitioning types is M, only N out of M available partition types are used to partition the current block, wherein M and N are integers and M≥N.

17. An apparatus of video coding used by a video coding system, the apparatus comprising one or more electronic circuits or processors arrange to:
receive input data associated with a current block in a current picture, wherein the input data associated with the current block corresponds to prediction residuals of the current block at an encoder side and the input data associated with the current block corresponds to coded prediction residuals of the current block at a decoder side;
determine a partition structure corresponding to partition the current block into smaller TU (transform unit) blocks when the partition structure is less than or equal to a maximum allowed split depth or when a block size of at least one of smaller TU blocks is a supported core transform size, wherein the current block is partitioned into final smaller TU blocks according to the partition structure; and
apply a transform coding process to the current block according to the partition structure, wherein the transform coding process is skipped for at least one of the final smaller TU blocks;
wherein a flag is signalled for the current block to indicate whether the current block is allowed to skip the transform coding process for said at least one of the final smaller TU blocks;
wherein if the flag indicates that the current block is allowed to skip the transform coding process for said at least one of the final smaller TU blocks, an indicator is signalled explicitly or inferred implicitly for each of the final smaller TU blocks to indicate whether the transform coding process is skipped or not for said each of the final smaller TU blocks;
wherein if all the final smaller TU blocks except for a last TU block are skipped for the transform coding process, then the last TU block is implicitly inferred as non-skipping for the transform coding process.

* * * * *